Patented Dec. 19, 1950

2,534,222

UNITED STATES PATENT OFFICE 2,534,222

METHODS OF DETOXIFYING POISONOUS COMPOUNDS

Arno Brasch, Brooklyn, N. Y., assignor, by mesne assignments, to Electronized Chemicals Corporation, New York, N. Y., a corporation of Delaware No Drawing. Application September 24, 1947, Serial No. 775,883

14 Claims. (Cl. 99—69)

This application is a continuation-in-part of my U. S. patent applications Serial No. 442,136, filed May 7, 1942, now abandoned, for Method for Manufacturing Synthetic Rubber and Devices Therefor; Serial No. 442,137, filed May 7, 1942, now Patent No. 2,429,217, for Devices for Treatment of Matters with High Speed Electrons; Serial No. 442,138, filed May 7, 1942, now abandoned, for Method for Treatment of Matters; Serial No. 450,923, filed July 14, 1942, now abandoned, for Method and Means for Treatment of Perishable Substances and Products so Obtained; Serial No. 451,370, filed July 17, 1942, now abandoned, for Method and Means for Treatment of Vegetative Substances and Products so Obtained; Serial No. 487,179, filed May 15, 1943, now abandoned, for Process for Cracking Hydrocarbons by Means of Ultra High Speed Electrons; Serial No. 488,278, filed May 24, 1943, now abandoned, for Preparation and Cracking of Hydrocarbons and Other Chemical Compounds by Means of Ultra High Speed Electrons to Obtain Rubber Starting Materials; and Serial No. 575,878, filed February 2, 1945, for Sterilization of Therapeutical Preparations.

My present invention relates to methods of detoxifying stimulant and poisonous compounds contained in products for human and animal consumption.

It is an object of my present invention to provide methods of treating products for human and animal consumption such as coffee, tea, tobacco and the like in order to detoxify, e. g. destroy or decompose partly or wholly the stimulant and poisonous substances contained therein so as to render them harmless without essentially impairing the taste, flavor and appearance of the treated products.

More particularly, it is an object of my present invention to provide methods for detoxifying, e. g. by decomposing partly or entirely alkaloids such as nicotine, caffeine and theine contained in tobacco, coffee and tea, respectively, so as to remove their stimulant and poisonous character without influencing the appearance, flavor and taste of the treated alkaloid-containing products.

With the above objects in view, my present invention mainly consists in treating the above mentioned products with corpuscular rays, particularly high speed electrons having a substantial penetration range so as to destroy, decompose or transform the stimulant and poisonous substances, particularly alkaloids contained in the treated products without noticeably attacking or influencing the other desired characteristics of such products.

My present invention is based upon the discovery that corpuscular rays, particularly high speed electrons, have a highly differentiated and selective action, e. g. they attack only certain ingredients of the treated products without influencing the others.

In the case of stimulant and poisonous substances to be destroyed, particularly in the case of alkaloids, it is mainly a matter of decomposing the radiation labile molecules of the dangerous alkaloids or of substantially changing their nature by transforming them into non-stimulant and non-poisonous compounds so as to eliminate their stimulant and poisonous effects. I have found that bombardment with corpuscular particles, particularly high speed electrons, in accordance with my present invention, has the effects set forth above.

Thus, for instance, in the case of coffee, caffeine which is a basic alkaloid having highly unstable properties, is more apt to be influenced by the differentiated and selective action of the high speed electrons used in accordance with my present invention than the more stable substances that give coffee its characteristic taste, flavor, and appearance.

I wish to note that the term "products" and "products containing stimulants and poisonous compounds", as used above and in the following description and claims, are intended to cover all types of products, particularly products for human use, e. g. consumption, which contain poisonous and/or stimulant compounds adapted to be selectively attacked by electron bombardment.

In order to obtain the objects of my present invention, i. e. in order to destroy alkaloids contained in products of the type set forth above, it is of particular advantage to use high speed electrons of a velocity equivalent to more than one million volts. Although such electron bombardment can be carried out in many different ways with excellent results, I noticed that by bombarding certain products for a considerable time with high speed electrons certain changes in taste, odor, appearance and structure were caused.

I have found that these changes are caused by certain side reactions which consist mainly in creation of hydrogen peroxide, ozone, denaturation of the proteins present in certain foodstuffs, decarboxylation, and hydrolysis of certain electron bombarded products to be detoxified.

I have found that the side reactions mentioned in the preceding paragraph are mainly due to the interactions of the electrons with the atmosphere surrounding the electron bombarded products to be detoxified and the reactive compounds within these products, to the production of heat and other related factors, and not due to the action of the high speed electrons proper.

I have also found that these side reactions can be reduced by shortening the time periods during which the products, e. g. coffee, tea, and tobacco, are irradiated. Therefore, processes according to my present invention mainly consist in irradiating the products to be detoxified with high speed electrons during one or more extremely short time period. Such reduction of the length of the single irradiation periods results in reduction or avoidance of the above listed undesired side reactions.

Furthermore, it is often important to avoid creation of heat in the irradiated products to be detoxified; this object is also attained by reducing the length of the single irradiation periods.

I have obtained very good results by using for detoxifying purposes high speed electrons of a velocity equivalent to more than two, preferably, more than four million volts; excellent results were obtained by use of high speed electrons of a velocity equivalent to about six million volts.

Furthermore, I have found it advisable to reduce the single irradiation periods to less than $10^{-4}$, preferably to about $10^{-6}$ of a second. In some cases, it will even be indicated to use irradiation periods each lasting $10^{-7}$ of a second, or less.

I wish to emphasize that the short duration of the single irradiation periods does not change the effect of such irradiations on the alkaloids contained in the irradiated products to be detoxified; I have found that such irradiations have a detoxifying effect, i. e. decompose the alkaloids, inasmuch as such alkaloids need not be decomposed entirely during a single irradiation period, but only be vigorously attacked, such attacks, particularly if repeated during consecutive short irradiation periods, decompose the alkaloids which will then lose their stimulant and poisonous character a certain time after the irradiations are actually terminated.

Thus, it is evident that the length of each of the single irradiation periods is of minor importance from the point of view of decomposition of the alkaloids, but that only the total length of the irradiation periods together decides the irradiation effect.

Therefore, in order to obtain optimal detoxification effects, I propose, in accordance with my present invention, to irradiate the products to be detoxified with high speed electrons during a series of consecutive short time periods.

Preferably, the high speed electrons have a velocity equivalent to more than four million volts, e. g. about six million volts, and the irradiation periods have each a length of less than $10^{-4}$ of a second, e. g. of about $10^{-6}$ of a second.

The number of single irradiation periods needed depends upon the character of the irradiated product; thus, it is necessary that on the average each alkaloid particle in the product to be detoxified is hit during one or a series of consecutive short irradiation periods together by electrons having a total intensity of about $10^{-15}$ of a watt.

I have found that the above mentioned intensity of irradiation is necessary to have the desired decomposing effect; thus, it is advisable to regulate the velocity of the high speed electrons used for detoxification and the length of each irradiation period and their number in such a manner as to obtain the above indicated total intensity, i. e. to obtain an irradiation by which on the average each of the alkaloid particles is hit during consecutive irradiation periods together by electrons having the above indicated total intensity of $10^{-15}$ of a watt.

I may use for my new processes described above different types of devices for creating high speed electrons and also the most differently constructed and shaped irradiation chambers. However, I have found that the devices described in my U. S. Patents Nos. 2,043,733 and 2,099,327 are very well adapted and the most efficient ones for the purposes of my present invention. Thus, while any source of radiation can be used for the production of high speed electrons, my so-called condenser method which generates electric impulses of very short duration and great intensity by use of a laminated discharge tube proved most satisfactory. This method consists in using a plurality of condenser units, the number of which is selected according to the voltage required, charging these condenser units in parallel over charging resistances and discharging them by means of discharge spark gaps in series whereby the voltage is multiplied in accordance with the number of condenser units employed and in accordance with the voltage with which each of the individual condenser units has been charged.

This high voltage, which is at least one million volts, preferably however four or more million volts, is conducted to the cathode of a laminated discharge tube also described in my above mentioned U. S. patents. A discharge tube of this type is adapted to create high speed electrons having the required high velocity and adapted for the detoxification processes described above.

Although my above described processes are effective for a great variety of products to be detoxified, it is rather difficult to obtain satisfactory results with certain products. Thus, it is not always possible, by increase of the speed of the bombarding electrons and decrease of the length of the single irradiation periods, to avoid entirely certain of the above listed side effects, namely the creation of hydrogen peroxide, ozone and nitrous oxides, and the denaturation of proteins contained in some substances. Furthermore, during irradiation of certain substances, additional side reactions occur which cannot be eliminated by the raise of the velocity of the bombarding electrons and by reduction of the length of the single irradiation periods. Such unaffected side reactions are mainly the destruction of the natural coloring matters in the irradiated products, particularly the destruction of hemoglobin, chlorophylls and carotinoids present in some of the irradiated substances.

I have found that the side reactions listed in the preceding paragraph can be greatly reduced and in most cases completely avoided by cooling those products which are affected by such side reactions to a low temperature and irradiating the thus cooled products in the manner described above.

The degree of cooling depends on the character of the single products to be irradiated: Good results were already obtained by cooling to a temperature of $-20°$ C.; the results were, however, better if the products were cooled to a temperature of $-100°$ C., or less, and irradiated at such a low temperature.

Tests proved that by first cooling the products to be detoxified to the low temperatures mentioned above and then subjecting the thus cooled products to a series of very short irradiations by high speed electrons, it is possible to detoxify the stimulant and poisonous substances contained in certain products for human and animal consumption without noticeable change in appearance, taste and odor.

Generally, I have found that the combination of the three factors mentioned above, namely high speed electron irradiation, a series of very short irradiation periods, and cooling to a low temperature, not only suppresses oxidation, but also avoids all other above discussed side effects, leaving only the most rapidly occurring chemical and biological reactions unaffected.

It should be mentioned that during irradiation of some types of products to be detoxified with high speed electrons, certain side reactions occur which can hardly be avoided by any of my new processes defined above. This holds true, particularly, for products which are highly unstable to oxidation. Cooling to very deep temperatures and very short irradiation periods, as proposed above, are insufficient to avoid oxidation of such products during irradiation.

I have found it advisable to irradiate products of the type defined in the preceding paragraph in accordance with my present invention in the absence of oxidizing agents, e. g. in an atmosphere having an oxygen concentration which is reduced to such a degree that the amount of oxygen molecules present is insufficient to react during irradiation with the irradiated products. Such reduction of the oxygen concentration can be attained by use of an inert gaseous atmosphere, or by use of partial vacuum.

I have found that in order to attain good results, it is advisable to place some types of products to be treated in sealed containers and to irradiate the products while they are sealed in such containers. Of course, as set forth above, these containers should contain only very little or no oxygen at all so as to prevent oxidation of the irradiated products.

In accordance with my present invention, detoxification of products is preferably carried out in the following way:

First, the product to be detoxified is placed into a container from which the air is removed, either by introduction of an inert gas or by evacuating the container.

After the product to be detoxified is placed into the container and the air removed therefrom as described above, the container is air-tightly sealed.

Thereafter, the container together with the product to be irradiated is cooled to between 0° C. and —100° C., depending upon the type of product.

The thus cooled container and product to be irradiated are then subjected to irradiation with high speed electrons having a velocity equivalent to between three and six million volts during a series of consecutive very short time periods, each lasting between $10^{-4}$ and $10^{-6}$ of a second. This impulse irradiation is continued until on the average each poisonous, e. g. alkaloid particle, present in the irradiated product before irradiation is hit by high speed electrons having a total intensity of at least $10^{-15}$ of a watt.

The above described processes can be employed for a great variety of products for human and animal consumption. Practical tests carried out by irradiating various products with high speed electrons of a velocity equivalent to four million volts during a series of consecutive irradiation periods, each lasting about $10^{-6}$ of a second, showed the following results:

Coffee, irradiated several times in the manner set forth above, lost its highly stimulant character by decomposition of the caffeine contained therein.

Similarly, tea was irradiated twice with high speed electrons of the above specified velocity and tests showed that the theine contained in the tea was transformed by the electron bombardment into a neutral non-stimulant and non-poisonous compound.

Finally, electron bombardment of tobacco for a longer time period resulted in elimination of the poisonous characteristic of the nicotin contained therein.

Above tests show that the new processes proposed by me are well adapted for detoxification of a great variety of products for human and animal consumption.

It should be mentioned that some of the above described tests were carried out at low temperatures, i. e. the various products were cooled before irradiation. Some of the tests were carried out in an inert preferably gaseous atmosphere, some were carried out in a partial vacuum, and some were carried out under pressure, e. g. gas pressure. I have also found that in some cases, e. g. detoxifying of tobacco, it is preferable to carry out the bombardment with high speed electrons while the tobacco leaves are at an elevated temperature. It was also found that in some other cases, reduction of the temperature and avoidance of oxidizing substances greatly improved the detoxifying effects by preventing undesired side reactions.

It will be understood that each of the elements described above, or two or more together, may also find a useful application in other types of processes differing from the processes described above. Thus, for instance, my new process is also adapted to detoxify theobromine contained in cocoa.

While I have described the invention as embodied in processes for detoxifying various products, I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Method of detoxifying alkaloid-containing products for human and animal consumption, without substantially affecting the taste, odor and appearance of said products by bombarding the same with high speed electrons of a velocity equivalent to more than one million volts during at least one very short time period lasting less than $10^{-4}$ of a second.

2. Method of detoxifying alkaloid-containing products for human and animal consumption, without substantially affecting the taste, odor and appearance of said products by bombarding the same repeatedly with high speed electrons of a velocity equivalent to more than one million volts during consecutive very short time periods each lasting less than $10^{-4}$ of a second.

3. Method of detoxifying alkaloid-containing products for human and animal consumption, without substantially affecting the taste, odor and appearance of said products comprising the steps of cooling the same to a temperature below 0° C.; and bombarding the thus cooled substance with high speed electrons of a velocity equivalent to more than one million volts during at least one very short time period lasting less than $10^{-4}$ of a second.

4. Method of detoxifying alkaloid-containing products for human and animal consumption, without substantially affecting the taste, odor and appearance of said products comprising the steps of cooling the same to a temperature below 0° C.; and bombarding the thus cooled substance with high speed electrons of a velocity equivalent to more than one million volts during consecutive very short time periods each lasting less than $10^{-4}$ of a second.

5. Method of detoxifying alkaloid-containing products for human and animal consumption, without substantially affecting the taste, odor and appearance of said products comprising the steps of cooling the same to a temperature of below $-50°$ C.; and bombarding the thus cooled substance with high speed electrons of a velocity equivalent to more than one million volts during at least one very short time period lasting less than $10^{-4}$ of a second.

6. Method of detoxifying alkaloid-containing products for human and animal consumption, without substantially affecting the taste, odor and appearance of said products by bombarding the same in an inert gaseous atmosphere with high speed electrons of a velocity equivalent to more than one million volts during at least one very short time period lasting less than $10^{-4}$ of a second.

7. Method of detoxifying alkaloid-containing products for human and animal consumption, without substantially affecting the taste, odor and appearance of said products by bombarding the same repeatedly in a partial vacuum with high speed electrons of a velocity equivalent to more than one million volts during consecutive very short time periods each lasting less than $10^{-4}$ of a second.

8. Method of detoxifying alkaloid-containing products for human and animal consumption, without substantially affecting the taste, odor and appearance of said products by bombarding the same in a substantially oxygen-free atmosphere with high speed electrons of a velocity equivalent to more than one million volts during at least one very short time period lasting less than $10^{-4}$ of a second.

9. Method of detoxifying alkaloid-containing products for human and animal consumption, without substantially affecting the taste, odor and appearance of said products comprising the steps of cooling the same to a temperature below 0° C.; and bombarding the thus cooled substance in a substantially oxygen free atmosphere with high speed electrons of a velocity equivalent to more than one million volts during at least one very short time period lasting less than $10^{-4}$ of a second.

10. Method of detoxifying alkaloid-containing products for human and animal consumption, without substantially affecting the taste, odor and appearance of said products comprising the steps of placing said substance into a container; air-tightly closing said container; and bombarding said substance air-tightly enclosed in said container with high speed electrons of a velocity equivalent to more than one million volts during at least one very short time period lasting less than $10^{-4}$ of a second.

11. Method of detoxifying alkaloid-containing products for human and animal consumption, without substantially affecting the taste, odor and appearance of said products comprising the steps of placing said substance in a container; air-tightly closing said container; and bombarding said products air-tightly enclosed in said container with high speed electrons of a velocity equivalent to more than one million volts during consecutive very short time periods each lasting less than $10^{-4}$ of a second.

12. Method of detoxifying alkaloid-containing products for human and animal consumption, without substantially affecting the taste, odor and appearance of said products comprising the steps of placing said substance in a container; air-tightly enclosing said container; cooling said substance air-tightly enclosed in said container to a temperature below 0° C.; and bombarding said cooled product air-tightly enclosed in said container with high speed electrons of a velocity equivalent to more than one million volts during at least one very short time period lasting less than $10^{-4}$ of a second.

13. Method of detoxifying alkaloid-containing products for human and animal consumption, without substantially affecting the taste, odor and appearance of said products compriisng the steps of placing said substance into a container; air-tightly closing said container; cooling said substance air-tightly enclosed in said container to a temperature below 0° C.; and bombarding said cooled substance air-tightly enclosed in said container with high speed electrons of a velocity equivalent to more than one million volts during consecutive very short time periods each lasting less than $10^{-4}$ of a second.

14. Method of detoxifying alkaloid-containing products for human and animal consumption, without substantially affecting the taste, odor and appearance of said products comprising the steps of placing said substance into a container; removing air contained in said container; air-tightly closing said container; and bombarding said substance air-tightly enclosed in said container with high speed electrons of a velocity equivalent to more than one million volts during at least one very short time period lasting less than $10^{-4}$ of a second.

ARNO BRASCH.

REFERENCES CITED

The following references are of record in the file of this patent:

UNITED STATES PATENTS

| Number | Name | Date |
| --- | --- | --- |
| 855,449 | Dorn | June 4, 1907 |
| 1,275,417 | Gillet | Aug. 13, 1918 |
| 1,906,402 | Newton | May 2, 1933 |
| 1,907,507 | Coolidge | May 9, 1933 |
| 1,952,588 | Golden | Mar. 27, 1934 |
| 2,007,765 | Knudson | July 9, 1935 |
| 2,018,599 | Brasch | Oct. 22, 1935 |
| 2,043,733 | Brasch | June 9, 1936 |
| 2,061,960 | Coffmann et al. | Nov. 24, 1936 |
| 2,099,327 | Brasch | Nov. 16, 1937 |
| 2,122,741 | Haddad | July 5, 1938 |
| 2,161,985 | Szilard | June 13, 1939 |

FOREIGN PATENTS

| Number | Country | Date |
| --- | --- | --- |
| 154,213 | Great Britain | Apr. 24, 1922 |
| 190,512 | Great Britain | Dec. 8, 1922 |
| 299,735 | Great Britain | Oct. 30, 1928 |
| 440,023 | Great Britain | Dec. 12, 1935 |